3,457,264
N-[5H-DIBENZO-(a,d)-CYCLOHEPTEN - 5 - ONE-11-YL]-PIPERAZINES AND METHOD OF PREPARING THE SAME
René Viterbo, Michele Matursi, and Sabino Lembo, Naples, Italy, assignors to Farmochimica Cutolo-Calosi S.p.A., Naples, Italy, a corporation of Italy
No Drawing. Filed July 6, 1965, Ser. No. 486,578
Int. Cl. C07d 51/70; C07c 87/40; A61k 27/00
U.S. Cl. 260—268          7 Claims

ABSTRACT OF THE DISCLOSURE

Novel compounds of the group consisting of those having the general formula:

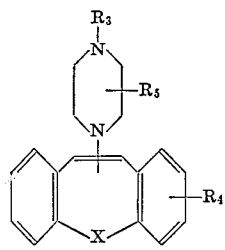

in which $R_3$ and $R_5$ are members of the group consisting of hydrogen, alkyl, —$CH_2CH=CH_2$, —$CH_2C\equiv CH$,

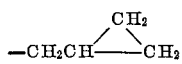

phenyl, benzyl, cyanoethyl, chlorophenyl, ethoxy ethyl, ethyl acetamide, methoxyphenyl, carbalkoxy, and hydroxyalkyl, $R_4$ is a member of the group consisting of hydrogen, halogen, lower alkyl, alkoxy, amino, monoalkylamino, diethylamino, and trifluoromethyl, and X is

or

and the acid addition salts thereof. These compounds are prepared by reacting a 5H-5,11-diketodibenzo-(a,d)-cycloheptene with a suitably substituted piperazine. The compounds have antihypertensive, sedative, myorelaxant, local anesthetic, analgesic, antipyretic, and spasmolytic activities.

---

This invention relates to new en-amines having the group:

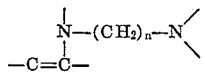

More particularly, the new compounds of the present invention are dibenzosuberen derivatives having the general formula:

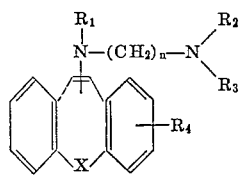

wherein $R_1$, $R_2$, and $R_3$ are lower alkyl groups of 1 to 4 carbon atoms; and $R_4$ is hydrogen, chlorine, bromine, or other halogen, lower alkyl, methoxy, amino, monoalkylamino, dialkylamino, trifluoromethyl, and various other substituents; and $n$ is a small whole number.

$R_1$ and $R_2$ may together form a heterocyclic ring structure with two nitrogen atoms to which they are attached such as piperazyl, which may in turn have various substituents on the nitrogen atom or on the ring itself, as for example:

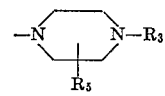

in which case $R_3$ and $R_5$ may be hydrogen, alkyl, —$CH_2CH=CH_2$, —$CH_2\equiv CH$

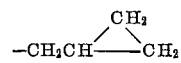

cyanoethyl, chlorophenyl, ethoxy ethyl, ethyl acetamide, phenyl, benzyl, chlorophenyl, methoxyphenyl, substituted benzyl, aralkyl, alkoxy, carbalkoxy, hydroxyalkyl, esters, ethers, and various other groupings. Various such substituents are illustrated in the specific examples which follow:

X may be

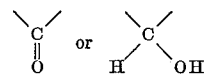

The acid addition and quaternary ammonium salts of the compounds are also included within the scope of the invention.

Compounds having the above-indicated general formula are useful for many purposes depending on the particular substituents represented by $R_1$, $R_2$, $R_3$, and $R_4$ and X. One use of importance is their use as intermediates for the preparation of other organic compounds and especially of compounds with a sufficiently high pharmacologic activity to make them useful primarily as therapeutic agents. The compounds covered by the invention are indeed pharmacologically active especially as antihypertensive, sedative, myorelaxant, local anesthetic, analgesic, antipyretic, and spasmolytic, or other important physiological actions.

En-amines are peculiar compounds and are therefore considered as a separate class of nitrogen-containing compounds and not as simple amine derivatives. Detailed reviews are devoted to en-amines (see for instance Szmuszkowicz, Enamines, pp. 1–110 in: Raphael, R. A., Taylor, E. C., and Wynberg, H., Advances in Organic Chemistry: Methods and Results, vol. 4, Interscience Publishers, New York (1963)) in which structure as well as reactivity of these compounds are described.

En-amines easily undergo hydrolytic cleavage in acidic medium resulting in formation of a keto compound and the split-off amine grouping. One of the most active compounds of the present invention, that of Example 1 which has hypotensive activity, is easily hypolyzed to a diketone. However, this diketone is devoid of pharmacological activity. From this it appears that the compound is not metabolized in vivo to the diketone but is transformed in some other way. Another peculiar property of en-amines is the case with which they can be alkylated or acylated. Such alkylation and acylation could be a preliminary step in the metabolic fate of the compounds of the present invention. The presence of the polar oxygen function designated by X in the general formula in the 5 position of the tricyclic ring very probably modifies the drug-receptor interaction inasmuch as it appears that this group is essential for hypotensive activity.

The compounds of the invention in which X of the general formula is =C=O may be prepared by one of the following general methods:

Method A

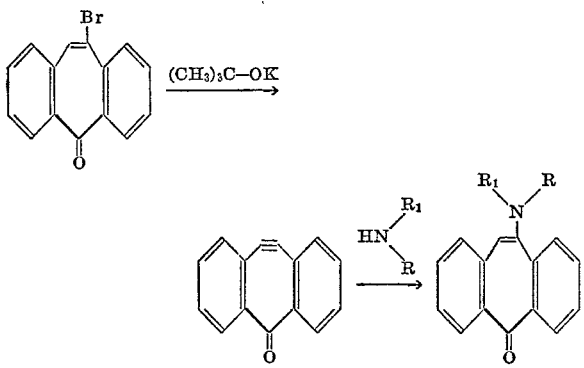

Method B

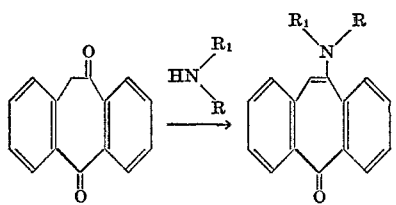

Reacting the obtained 5-one compounds with $NaBH_4$ yields the 5-ol compounds (X=—CHOH).

From available data obtained on compounds that have been synthesized and screened, orally administered doses ranging from 0.1 to 0.5 milligram per kilogram of body weight give a very marked hypotensive activity. At doses ranging from 1 to 15 milligrams per kilogram, a pronounced reduction on spontaneous motility, myorelaxation, local anesthetic, analgesic, anti-inflammatory, lowering of body temperature and antipyretic activity is observed. In vitro, a marked spasmolytic activity is noted.

To indicate more clearly the nature of some of the substituents attached to the basic moiety, the following tables are given.

TABLE I

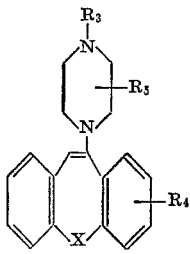

| X | $R_4$ | $R_3$ | $R_5$ | M.P. °C. |
|---|---|---|---|---|
| C=O | H | H | H | 164–166 |
| C=O | H | $CH_3$ | H | 130–132 |
| C=O | H | $CH_3$ | $CH_3$ | 127–130 |
| C=O | Br | $CH_3$ | H | 162–164 |
| C=O | Cl | $CH_3$ | H | 160–162.5 |
| C=O | $CH_3$ | $CH_3$ | H | 169–171 |
| C=O | H | $C_2H_5$ | H | 125.5–128 |
| C=O | H | $nC_3H_7$ | H | 144–145 |
| C=O | H | $CH(CH_3)_2$ | H | 117–119 |
| C=O | H | $nC_4H_9$ | H | 95–98 |
| C=O | H | $CH_2CH(CH_3)_2$ | H | 125–126 |
| CHOH | H | $COOC_2H_5$ | H | 161–163 |
| C=O | H | $CH_2CH_2COOC_2H_5$ | H | 86–88 |
| C=O | H | $CH_2CONCH_2H_5$ | H | 99–102 |
| C=O | H | $CH_2CH_2CN$ | H | 135–137 |
| C=O | H | $CH_2CH_2OC_2H_5$ | H | 108–110 |
| C=O | H | $C_6H_5$ | H | 165–167 |
| CHOH | H | $C_6H_5$ | H | 213–214 |
| C=O | H | Para $CH_3OC_6H_4$ | H | 178–180 |
| C=O | H | Meta $CH_3OC_6H_4$ | H | 137–140 |
| C=O | H | Para $ClC_6H_4$ | H | 219–221 |
| C=O | H | Meta $ClC_6H_4$ | H | 156–158 |
| C=O | H | $CH_2C_6H_5$ | H | 98–102 |
| CHOH | H | $CH_2C_6H_5$ | H | 179–181 |
| C=O | H | $COOC_2H_5$ | H | 143.5–145.5 |

TABLE II

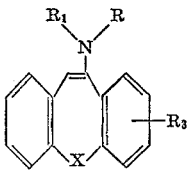

| X | $R_1$ | R | $R_3$ | B.P./mm. |
|---|---|---|---|---|
| C=O | $CH_3$ | $CH_2CH_2N(C_2H_5)_2$ | H | 202/0.005 |
| C=O | H | $CH_2CH_2N(CH_3)_2$ | H | 148/0.005 |
| C=O | $CH_3$ | $CH_2CH_2CH_2N(CH_3)_2$ | H | 195/0.025 |
| C=O | $CH_3$ | $CH_2CH_2N(CH_3)_2$ | H | 205/0.01 |

The pharmacological activity of some of the following compounds is illustrated in the following tables:

TABLE III.—SPONTANEOUS MOTILITY ON MOUSE (DEWS' METHOD)

| Compound of— | Administration route | Dosage | Percent reduction of passages |
|---|---|---|---|
| Example 1 | Per os | 1/30 $LD_{50}$ | −100 |
| Example 2 | Per os | 1/5 $LD_{50}$ | −73 |
| Example 5 | Per os | 1/5 $LD_{50}$ | −88 |
| Example 8 | Per os | 1/10 $LD_{50}$ | −89 |
| Example 10 | Per os | 1/10 $LD_{50}$ | −95 |
| Example 13 | Per os | 1/10 $LD_{50}$ | −93 |
| Example 14 | Per os | 1/5 $LD_{50}$ | −98 |
| Example 15 | Per os | 1/10 $LD_{50}$ | −83 |

TABLE IV.—ANALGESIC ACTIVITY (HOT PLATE METHOD)

| Compound of— | Administration route | Dosage | Time increase |
|---|---|---|---|
| Example 1 | Per os | 1/30 $LD_{50}$ | +240% |
| Example 5 | Per os | 1/5 $LD_{50}$ | +275% |
| Example 6 | Per os | 1/10 $LD_{50}$ | +298% |
| Example 7 | Per os | 1/10 $LD_{50}$ | +398% |
| Example 8 | Per os | 1/10 $LD_{50}$ | +278% |
| Example 10 | Per os | 1/10 $LD_{50}$ | +309% |
| Example 11 | Per os | 1/10 $LD_{50}$ | +262% |
| Example 13 | Per os | 1/10 $LD_{50}$ | +293% |
| Example 14 | Per os | 1/10 $LD_{50}$ | +420% |
| Example 15 | Per os | 1/10 $LD_{50}$ | +283% |

TABLE V.—ANTI-INFLAMMATORY ACTIVITY ON RATS (WILHELMI'S METHOD)

| Compound of— | Administration route | Dosage | Percent reduction after hours |
|---|---|---|---|
| Example 1 | Per os | 1/8 $LD_{50}$ | 25 (4 hours) |
| Example 5 | Per os | 1/5 $LD_{50}$ | 50 (8 hours) |
| Example 6 | Per os | 1/10 $LD_{50}$ | 55 (4 hours) |
| Example 7 | Per os | 1/10 $LD_{50}$ | 28 (4 hours) |
| Example 8 | Per os | 1/10 $LD_{50}$ | 15 (8 hours) |
| Example 10 | Per os | 1/10 $LD_{50}$ | 54 (4 hours) |
| Example 11 | Per os | 1/10 $LD_{50}$ | 58 (4 hours) |
| Example 13 | Per os | 1/10 $LD_{50}$ | 66 (4 hours) |
| Example 14 | Per os | 1/10 $LD_{50}$ | 78 (4 hours) |
| Example 15 | Per os | 1/10 $LD_{50}$ | 37 (4 hours) |

TABLE VI.—HYPOTENSIVE ACTIVITY IN CATS

| Compound of— | Administration route | Dosage | Percent pressure reduction |
|---|---|---|---|
| Example 1 | Per iv | 0.1 mg./kg. | 40 |
| Example 2 | Per os | 1 mg./kg. | 15 |
| Example 6 | Per iv | 0.1 mg./kg. | 25 |
| Example 7 | Per iv | 0.1 mg./kg. | 45 |
| Example 8 | Per iv | 0.1 mg./kg. | 37 |
| Example 10 | Per iv | 0.1 mg./kg. | 19 |
| Example 11 | Per iv | 0.5 mg./kg. | 13 |
| Example 13 | Per iv | 0.1 mg./kg. | 38 |
| Example 14 | Per iv | 0.1 mg./kg. | 35 |
| Example 15 | Per iv | 0.1 mg./kg. | 38 |
| Example 25 | Per iv | 0.5 mg./kg. | 33 |
| Example 27 | Per os | 1.0 mg./kg. | 17 |

The preparation of the new compounds of the present invention will be illustrated by the following examples. The melting points given are uncorrected unless otherwise indicated.

EXAMPLE 1

N-[5H-dibenzo-(a,d)-cyclohepten-5-one-11-yl]-N'-methylpiperazine

To a solution of 0.750 gram potassium in 12 cc. of anhydrous tertiary butylalcohol and 20 cc. anhydrous ether was added a solution of 2.05 grams (7.1 millimoles) 10-bromo-5H-dibenzo-(a,d)-cyclohepten-5 - one (Treibs, W. and Klinkhammer, H. J., Ber. 84, 671 (1951)) and 12 grams (12 cc.=120 millimoles) of freshly distilled N-methylpiperazine in 50 cc. anhydrous ether. The deep red solution was stirred at room temperature for five hours, poured in water and extracted with ether. The ether solution was washed three times with distilled water. The separated organic layer is dried over anhydrous $Na_2SO_4$, filtered, and distilled off at water pump vacuum. A yellow solid residue is obtained (2.29 grams) which was recrystallized from ethanol yielding 1.7 grams yellow crystals of N-[dibenzo-(a,d)-cyclohepten-5-one-11-yl]-N'-methylpiperazine having a melting point of 130° C. to 132° C.

U.V. in EtOH: $\lambda_{max}=248$ m$\mu$, $\epsilon=28,000$; $\lambda_{max}=318$ m$\mu$, $\epsilon=11,200$.

To the solution of 1.490 grams maleic acid in 5 cc. ethanol the solution of 3.5 grams of N-[5H-dibenzo-(a,d)-cyclohepten-5-one-11-yl]-N'-methylpiperazine in 10 cc. ethanol was added. Thirty (30) cc. anhydrous ether is added and the solution left overnight at 4° C. The crystalline precipitate was filtered off, washed with 5 cc. of cold anhydrous ether, and dried at room temperature at a pressure of 0.01 mm. Hg.

The yellow crystalline maleate salt of N-[5H-dibenzo-(a,d) - cyclohepten-5-one-11-yl] - N' - methylpiperazine (4.170 grams) was obtained with a melting point of 178° C. to 180° C.

U.V. in ethanol: $\lambda_{max}=249$ m$\mu$, $\epsilon=29,100$; $\lambda_{max}=318$ m$\mu$, $\epsilon=11,200$.

The same compound is obtained by the following procedure: One (1) gram 5H-5,11-diketo-dibenzo-(a,d)-cyclohepten and 1 gram N-methyl piperazine dissolved in 10 cc. anhydrous benzene are refluxed sixteen hours. Water is eliminated continuously with a Dean-Stark trap. The cooled solution is partitioned between benzene and water. The separated organic phase is extracted with 0.1 N maleic acid and discarded. The aqueous layer is made alkaline with 2 N NaOH. The solid yellow precipitate is extracted with ether. The ether layer is washed to neutrality with water, dried over anhydrous $Na_2SO_4$ and evaporated. The solid yellow residue (1 gram) is crystallized from ethanol and had a melting point of 128° C. to 132° C. and was identical with the compound obtained by the above method. There was no depression of the melting point when the crystals were mixed, and the I.R. and U.V. spectra were identical.

EXAMPLE 2

N-[5H-dibenzo-(a,d)-cyclohepten-5-ol-11-yl]-N'-carbethoxypiperazine

Carbethoxypiperazine (0.71 gram) and 1 gram 5H-10,11 - dihydro-dibenzo-(a,d)-cyclohepten-5,10-dione are dissolved in 30 cc. toluene and refluxed for sixteen hours. The cooled solution is washed with water, dried over anhydrous $Na_2SO_4$ and evaporated. The oily residue is dissolved in 60 cc. methanol and slowly added to a suspension of 1 gram $NaBH_4$ in 10 cc. methanol. The mixture was left one hour at room temperature, poured carefully on crushed ice, and extracted with benzene. The organic layer was washed to neutrality with water, dried over anhydrous $Na_2SO_4$, and the solvent distilled off. The solid residue (0.9 gram) was crystallized from ethanol and had a melting point of 161° C. to 163° C.

U.V. in ethanol: $\lambda_{max}=295$ m$\mu$, $\epsilon=13,800$.

EXAMPLE 3

N-[5H-dibenzo-(a,d)-cyclohepten-5-one-11-yl]-N'-phenylpiperazine

To a solution of 11.17 grams potassium in 180 cc. anhydrous tertiary butanol and 290 cc. anhydrous ether was added 31.8 grams (111 millimoles) 10-bromo-5H-dibenzo-(a,d)-cyclohepten-5-one. After ten minutes of stirring at room temperature a solution of 84 grams (518 millimoles) N-phenylpiperazine in 200 cc. anhydrous ether was slowly added and stirring was continued. The color of the solution changes from red to yellow and a yellow precipitate appears. Anhydrous ether (200 cc.) is added, and after five hours, 200 cc. water is carefully added. The mixture is extracted with ethylacetate. The organic phase is extracted with water, the organic layer is separated, dried over anhydrous $Na_2SO_4$ and distilled at reduced pressure (water pump). The yellow residue crystallized from chloroform/methanol yielded 35.6 grams with a melting point of 165° C. to 167° C.

U.V. in ethanol: $\lambda_{max}=248$ m$\mu$, $\epsilon=39,250$; $\lambda_{max}=316$ m$\mu$, $\epsilon=11,800$.

EXAMPLE 4

N-[5H-dibenzo-(a,d)-cyclohepten-5-ol-11-yl]-N-benzylpiperazine

N-[5H-dibenzo - (a,d) - cyclohepten-5-one-11-yl]-N'-benzylpiperazine (5 grams) dissolved in 100 cc. methanol and 50 cc. tetrahydrofuran are added dropwise to the ice-water cooled solution of 4 grams $NaBH_4$ in 100 cc. methanol. The solution was left at room temperature for twelve hours and poured carefully on crushed ice. The white solid precipitate was collected, dissolved in ether, and washed to neutrality with water. The organic layer was dried over anhydrous $Na_2SO_4$ and evaporated. The solid residue (3.8 grams) was crystallized from ethanol and had a melting point of 179° C. to 181° C.

U.V. in ethanol: $\lambda_{max}=298$ m$\mu$, $\epsilon=13,200$.

EXAMPLE 5

N-[5H-dibenzo-(a,d)-cyclohepten-5-one-11-yl]-N'-benzylpiperazine

To a solution of 10.12 grams potassium in 162 cc. tertiary butanol and 270 cc. of anhydrous ether was added 27 grams 10-bromo-5H-dibenzo-(a,d)-cyclohepten-5-one and successively 83.2 grams benzylpiperazine. The deep red solution was stirred at room temperature for five hours. After careful addition of 200 cc. water, the mixture was extracted with ethyl acetate. The organic layer was washed with water until the pH was 9 and dried over anhydrous $Na_2SO_4$. The solvent was evaporated at reduced pressure (water pump). Crystallization of the residue from ether yielded 11 grams of yellow crystals with a melting point of 97° C. to 102° C.

U.V. in ethanol: $\lambda_{max}=249$ m$\mu$, $\epsilon=28,300$; $\lambda_{max}=318$ m$\mu$, $\epsilon=11,400$.

EXAMPLE 6

N-[5H-dibenzo-(a,d)-cyclohepten-5-one-11-yl]-N'-ethylpiperazine

To a solution of 1.08 gram potassium in 16 cc. anhydrous tertiary butylalcohol and 28 cc. anhydrous ether was added a solution of 3.08 grams (10.8 millimoles) 10-bromo - 5H - dibenzo - (a,d) - cyclohepten - 5 - one and 3.7 grams (33 millimoles) ethylpiperazine in 80 cc. anhydrous ether. The deep red solution was stirred at room temperature for five hours. The solvent is evaporated at reduced pressure (water pump) at 40 to 50° C.; water is carefully added to the residue and extracted with ether. The organic layer is washed to neutrality with water and then extracted with an 0.1 molar solution of maleic acid.

The combined aqueous extracts are brought to pH 10 with a 2 N $Na_2CO_3$ solution and extracted with ether. The ether layer is washed to neutrality with water and dried over anhydrous $Na_2SO_4$. The solvent is evaporated and a yellow residue is obtained (3.08 grams) which upon recrystallization from ethanol had a melting point of 125.5° C. to 128° C.

U.V. in ethanol: $\lambda_{max}$=248 m$\mu$, $\epsilon$=28,000; $\lambda_{max}$=318 m$\mu$, $\epsilon$=11,200.

To a solution of 1.5 gram of N-[5H-dibenzo-(a,d)-cyclohepten - 5 - one - 11 - yl] - N' - ethylpiperazine in 10 cc. ethanol was added a solution of 0.566 gram maleic acid in 5 cc. ethanol. Ether (60 cc.) is added and left overnight at 4° C. The crystalline yellow precipitate is collected, washed with 5 cc. anhydrous ether, and dried at room temperature at a pressure of 0.01 mm. Hg. The product has a melting point of 167° C. to 169° C.

U.V. in ethanol: $\lambda_{max}$=248 m$\mu$, $\epsilon$=28,500; $\lambda_{max}$=318 m$\mu$, $\epsilon$=11,000.

EXAMPLE 7

N-[5H-dibenzo-(a,d)-cyclohepten-5-one-11-yl]-N'-n-propylpiperazine

To a solution of 2.44 grams potassium in 36 cc. anhydrous tertiary butylalcohol and 65 cc. anhydrous ether was added a solution of 6.79 grams (23.8 millimoles) 10-bromo - 5H - dibenzo - (a,d) - cyclohepten - 5 - one and 9.17 grams (71 millimoles) N-n-propylpiperazine in 80 cc. anhydrous ether. The deep red solution was stirred at room temperature for seven hours. After careful addition of 40 cc. of water, the mixture was extracted with ether. The ether layer is separated and washed to neutrality with water and then with an 0.1 N maleic acid solution. The organic layer is then discarded. The aqueous solution is made alkaline with NaHCO$_3$ and brought to pH 10 with 2 N NaOH and extracted with ether. The ether phase is washed until neutral with water and dried over anhydrous Na$_2$SO$_4$. The solvent was evaporated at reduced pressure (water pump) and a yellow solid residue (6.36 grams) is obtained. Recrystallized from ethanol, the yellow needles had a melting point of 144° C. to 145° C.

U.V. in ethanol: $\lambda_{max}$=248 m$\mu$, $\epsilon$=27,700; $\lambda_{max}$=318 m$\mu$, $\epsilon$=11,100.

To a solution of 2.17 grams of N-[5H-dibenzo-(a,d)-cyclohepten - 5 - one - 11 - yl] - N' - n - propylpiperazine in 100 cc. anhydrous ethanol was added a solution of 0.800 gram maleic acid in 8 cc. anhydrous ethanol. Anhydrous ether (200 cc.) is added, and the solution left overnight at 4° C. The crystalline precipitate is collected, washed with 10 cc. cold ether, and dried at room temperature at 0.01 mm. Hg. The yellow crystals have a melting point of 164° C. to 166° C.

U.V. in ethanol: $\lambda_{max}$=248 m$\mu$, $\epsilon$=29,000; $\lambda_{max}$=317 m$\mu$, $\epsilon$=11,380.

EXAMPLE 8

N-[5H-dibenzo-(a,d)-cyclohepten-5-one-11-yl]-N'-n-butylpiperazine

To a solution of 1.68 grams potassium in 25 cc. anhydrous tertiary butanol and 45 cc. anhydrous ether was added a solution of 4.68 grams (16.4 millimoles) 10-bromo - 5H - dibenzo - (a,d) - cyclohepten - 5 - one and 6.7 grams (47 millimoles) N-n-butylpiperazine in 50 cc. anhydrous ether. The deep red solution was stirred at room temperature for five hours. The solvent was distilled off under reduced pressure (water pump) and to the residue was carefully added 150 cc. water. The suspension was extracted with ether and the ether layer is washed with water until the aqueous layer has reached pH 8. The ether layer is separated and extracted with an 0.1 N maleic acid solution. The ether layer is discarded. The acidic solution is brought to pH 10 with 1 N Na$_2$CO$_3$ solution and extracted with ether. The ether layer is washed with water to neutrality, dried over anhydrous Na$_2$SO$_4$ and evaporated. After recrystallization in ethanol of the yellow residue (4.38 grams) the compound had a melting point of 95° C. to 98° C.

U.V. in ethanol: $\lambda_{max}$=248 m$\mu$, $\epsilon$=28,300; $\lambda_{max}$=318 m$\mu$, $\epsilon$=11,300.

To a solution of 2.02 grams of N-[5H-dibenzo-(a,d)-cyclohepten-5-one-11-yl]-N'-n-butylpiperazine in 10 cc. anhydrous ethanol was added a solution of 0.700 gram maleic acid in 5 cc. anhydrous ethanol. After filtration 80 cc. anhydrous ether is added and the solution left overnight at 4° C. The precipitated crystalline powder is collected, washed with 15 cc. cold ether, and dried at room temperature at a pressure of 0.01 mm. Hg. The yellow crystals have a melting point of 160° C. to 162° C.

U.V. in ethanol: $\lambda_{max}$=248 m$\mu$, $\epsilon$=30,000; $\lambda_{max}$=318 m$\mu$, $\epsilon$=11,500.

EXAMPLE 9

N-[5H-dibenzo-(a,d)-cyclohepten-5-ol-11-yl]-N'-phenylpiperazine

To a solution of 10 grams N-[5H-dibenzo-(a,d)-cyclohepten-5-one-11-yl]-N'-phenylpiperazine in 80 cc. methanol and 100 cc. tetrahydrofuran, 7.5 grams NaBH$_4$ are added in small portions. The temperature of the reaction mixture is kept below 5° C. until all the NaBH$_4$ has been added and then overnight at room temperature. The mixture was carefully poured in crushed ice. The precipitated compound was filtered and dissolved in chloroform. The organic solution was extracted with water, dried over anhydrous Na$_2$SO$_4$ and evaporated at 40° C. (water pump). The solid white residue (8 grams) was recrystallized from CHCl$_3$ benzol and had a melting point of 213° C. to 214° C.

U.V. in ethanol: $\lambda_{max}$=248 m$\mu$, $\epsilon$=21,800; $\lambda_{max}$=300 m$\mu$, $\epsilon$=14,500.

EXAMPLE 10

N-[5H-dibenzo-(a,d)-cyclohepten-5-one-11-yl]-piperazine

To a solution of 7.2 grams potassium in 106 cc. anhydrous tertiary butanol and 290 cc. anhydrous ether was added a solutin of 125.4 grams anhydrous piperazine and successively 20 grams 10-bromo-5H-dibenzocyclohepten-5-one. The deep red solution was stirred at room temperature for thirteen hours. The solvent was evaporated under water pump vacuum, and to the residue was carefully added 300 cc. water and the mixture extracted three times with ethyl acetate. The combined organic layer was extracted with an 0.1 N maleic acid solution. The separated aqueous layer was brought to pH 9 with NaHCO$_3$ and extracted with ethyl acetate. This phase was separated, washed with water to neutrality, dried over anhydrous Na$_2$SO$_4$. Evaporation of the solvent left a yellow residue (17 grams) which recrystallized from ethanol and had a melting point of 164° C. to 166° C.

U.V. in ethanol: $\lambda_{max}$=248 m$\mu$, $\epsilon$=28,200; $\lambda_{max}$=318 m$\mu$, $\epsilon$=10,700.

To the solution of 3.930 grams of N-[5H-dibenzo-(a,d)-cyclohepten-5-one-11-yl]-piperazine in 80 cc. ethanol was added a solution of 1.6 grams maleic acid in 15 cc. ethanol. After addition of 150 cc. ether, the solution was left three hours at 4° C. The crystalline precipitate was filtered off, washed with 10 cc. of cold ether, and dried at room temperature at a pressure of 0.01 mm. Hg. The yield was 5.3 grams of the product which had a melting point of 160° C. (decomposition).

U.V. in ethanol: $\lambda_{max}$=248 m$\mu$, $\epsilon$=28,300; $\lambda_{max}$=315 m$\mu$, $\epsilon$=11,000.

EXAMPLE 11

N-[5H-dibenzo-(a,d)-cyclohepten-5-one-11-yl]-3,4-dimethylpiperazine

To the solution of 3.65 grams potassium in 54 cc. anhydrous tertiary butanol and 50 cc. anhydrous ether was added 10.2 grams 10-bromo-5H-dibenzo-(a,d)-cyclohepten-5-one. After ten minutes a solution of 11 grams 1,2-dimethylpiperazine in 100 cc. anhydrous ether was added, and the mixture was stirred five hours at room temperature. The solvent was distilled off at water pump vacuum. Water (100 cc.) was carefully added and the mixture extracted with ether. The ether layer was extracted with an 0.1 N maleic acid solution and discarded. The acidic layer was brought to pH 10 with a saturated NaHCO₃ solution and extracted with ether. The ether layer was washed with water to neutrality, dried over anhydrous Na₂SO₄ and evaporated. The yellow solid residue (12 grams) was crystallized from ethanol and had a melting point of 127° C. to 130° C.

U.V. in ethanol: $\lambda_{max}$=248 m$\mu$, $\epsilon$=28,700; $\lambda_{max}$=318 m$\mu$, $\epsilon$=11,400.

The solution of 6.0 grams maleic acid in 100 cc. ethanol is added to the solution of 2.2 grams of N-[5H-dibenzo-(a,d)-cyclohepten-5-one-11-yl]-3,4-dimethylpiperazine in 100 cc. ethanol. Anhydrous ether (200 cc.) is added, and the solution is left three hours at 4° C. The precipitated yellow crystals were filtered off, washed with cold ether, and dried at 50° C. at a pressure of 0.01 mm. Hg. The yield is 7.8 grams maleate with melting point of 179° C. to 180° C. (decomposition).

U.V. in ethanol: $\lambda_{max}$=248, m$\mu$, $\epsilon$=28,000; $\lambda_{max}$=315 m$\mu$, $\epsilon$=11,000.

EXAMPLE 12

N-[5H-dibenzo-(a,d)-cyclohepten-5-one-11-yl]-N'-($\beta$-cyanoethyl)-piperazine

N-[5H-dibenzo-(a,d)-cyclohepten-5 - one-11-yl]-piperazine (1.1 grams) and 5 cc. acrylonitrile dissolved in 10 cc. benzol are refluxed six hours. The solvent was distilled off. The solid residue was crystallized from ethanol and had a melting point of 135° C. to 137° C.

U.V. in ethanol: $\lambda_{max}$=248 m$\mu$, $\epsilon$=28,300; $\lambda_{max}$=318 m$\mu$, $\epsilon$=11,500.

EXAMPLE 13

N-[5H-dibenzo-(a,d)-cyclohepten-5-one-11-yl]-N'-isopropylpiperazine

To a solution of 1.75 grams potassium in 20 cc. anhydrous tertiary butanol and 50 cc. anhydrous ether was added 5.3 grams 10-bromo-5H-dibenzo-(a,d)-cyclohepten-5-one, and after ten minutes, a solution of 2.46 grams N-isopropylpiperazine in 50 cc. anhydrous ether. The mixture was stirred ten hours at room temperature and extracted with ether. The ether layer was washed until neutral with water and successively with 0.1 N maleic acid. The aqueous layer is made alkaline with a saturated solution of NaHCO₃ and extracted with ether. The ethereal solution is extracted twice with 2 N NaOH, washed with water to neutrality, dried over anhydrous Na₂SO₄ and evaporated. The yellow solid residue (5.5 grams) was crystallized from ether and had a melting point of 117° C. to 119° C.

U.V. in ethanol: $\lambda_{max}$=248.5 m$\mu$, $\epsilon$=27,300; $\lambda_{max}$=319 m$\mu$, $\epsilon$=11,000.

To the solution of 0.95 gram maleic acid in 10 cc. ethanol, the solution of 2.6 grams of N-[5H-dibenzo-(a,d)-cyclohepten-5-one-11-yl]-N'-isopropylpiperazine in 30 cc. ethanol is added. Anhydrous ether (200 cc.) is added, and the solution left twenty-four hours at 4° C. The crystalline precipitate was filtered off, washed with cold anhydrous ether, and dried at room temperature at a pressure of 0.01 mm. Hg. Yellow crystals (3.3 grams) are obtained with a melting point of 176° C. to 178° C.

U.V. in ethanol: $\lambda_{max}$=248 m$\mu$, $\epsilon$=27,500; $\lambda_{max}$=314 m$\mu$, $\epsilon$=11,100.

EXAMPLE 14

N-[5H-dibenzo-(a,d)-cyclohepten-5-one-11-yl]-N'-(propyl-2-methyl)-piperazine

To a solution of 4.2 grams potassium in 50 cc. anhydrous tertiary butanol and 100 cc. anhydrous ether was added 12 grams 5H-10-bromo-dibenzo-(a,d)-cyclohepten-5-one, and after ten minutes, 10 grams N-(propyl-1-methyl)-piperazine. The deep red solution was stirred ten hours at room temperature, poured carefully in water, and extracted with ether. The organic layer was washed to neutrality and extracted with 0.1 N maleic acid. The separated aqueous phase was made alkaline with saturated NaHCO₃ and extracted with ether. The ether layer was extracted with 2 N NaOH, washed to neutrality, dried over anhydrous Na₂SO₄ and evaporated. The yellow, solid residue (11 grams) was crystallized from ethanol and had a melting point of 125° C. to 126° C.

U.V. in ethanol: $\lambda_{max}$=248.5 m$\mu$, $\epsilon$=27,500; $\lambda_{max}$=319 m$\mu$, $\epsilon$=11,000.

To the solution of 7.62 grams of N-[5H-dibenzo-(a,d)-cyclohepten-5-one - 11-yl] - N'-(propyl-2-methyl)-piperazine in 30 cc. hot anhydrous ethanol is added the solution of 2.3 grams maleic acid in 10 cc. anhydrous ethanol. Ether (200 cc.) was added, and the solution left twenty-four hours at 4° C. The crystalline yellow precipitate (8.1 grams) is collected, washed with anhydrous ether, and dried at room temperature at a pressure of 0.01 mm. Hg. After recrystallization from ethanol, the product had a melting point of 149° C. to 151° C. (decomposition).

U.V. in ethanol: $\lambda_{max}$=248.5 m$\mu$, $\epsilon$=28,400; $\lambda_{max}$=315 m$\mu$, $\epsilon$=11,400.

EXAMPLE 15

N-[5H-dibenzo-(a,d)-cyclohepten-5-one-11-yl]-N'-($\beta$-ethoxy-ethyl)-piperazine To a solution of 2.11 grams potassium in 30 cc. anhydrous tertiary butanol and 50 cc. anhydrous ether was added 6.0 grams 10-bromo-5H-dibenzo-(a.d)-cyclohepten-5-one. The deep red solution was stirred at room tempeature for ten minutes and a solution of 3.3 grams N-$\beta$-ethoxyethyl-piperazine in 50 cc. anhydrous was added. The mixture was stirred at room temperature for five hours; 50 cc. water was carefully added; and the mixture was extracted with ether. The organic layer was extracted with water almost to neutrality (pH 8) and successively with 0.1 N maleic acid. The ether layer was discarded, and the aqueous layer brought to pH 12 with 2 N NaOH and extracted with ethylacetate. The organic phase was washed to neutrality with water, dried over anhydrous Na₂SO₄, and evaporated under reduced pressure (water pump). The solid yellow residue (3.0 grams) was crystallized from ethanol and had a melting point of 108° C. to 110° C.

U.V. in ethanol: $\lambda_{max}$=249 m$\mu$, $\epsilon$=28,100; $\lambda_{max}$=319 m$\mu$, $\epsilon$=11,400.

The solution of 3.1 grams of N-[5H-dibenzo-(a,d)-cyclohepten - 5 - one - 11 - yl]-N'-($\beta$-ethoxyethyl)-piperazine in 40 cc. hot anhydrous ethanol is added to the solution of 1 gram maleic acid in 7 cc. anhydrous ethanol. Ether (100 cc.) is added and the solution left overnight at 4° C. The precipitated crystals (3.7 grams) are separated, washed with ether, and dried under a pressure of 0.001 mm. Hg. They had a melting point of 151° C. to 154° C.

U.V. in ethanol: $\lambda_{max}$=249 m$\mu$, $\epsilon$=28,700; $\lambda_{max}$=315 m$\mu$, $\epsilon$=11,200.

EXAMPLE 16

N-[3-bromo-5H-dibenzo-(a,d)-cyclohepten-5-one-10-(or 11)-yl]-N'-methylpiperazine To the solution of 0.7 gram potassium in 20 cc. anhydrous tertiary butanol and 60 cc. anhydrous ether was added 2 grams 3,10- (or 11)-dibromo-5H-dibenzo-(a,d)-cyclohepten-5-one and the solution was refluxed for ten minutes. N-methylpiperazine (3.4 grams) was added and the reaction mixture stirred at room temperature for twelve hours. The mixture was carefully poured in ice water and extracted with ethylacetate. The organic layer was washed exhaustively with water and extracted with 0.1 N maleic acid. The aqueous layer was made alkaline with 2 N NaOH and extracted with ethylacetate. The organic layer was washed to neutrality with water, dried over anhydrous Na₂SO₄ and evaporated. The solid residue (1.75 grams) was crystallized from ethanol and had a melting point of 162° C. to 164° C.

U.V. in ethanol: $\lambda_{max}$=249 m$\mu$, $\epsilon$=28,700; $\lambda_{max}$= 324 m$\mu$, $\epsilon$=14,500.

EXAMPLE 17

N-[5H-dibenzo-(a,d)-cyclohepten-5-one-11-yl]-
N'-(ethyl-β-carboxy-ethyl)-piperazine N - [5H - dibenzo - (a,d) - cyclohepten-5-one-11-yl]-piperazine (1 gram) and 2 cc. acrylic acid ethyl ester are dissolved in 8 cc. benzene and refluxed for seven hours. The solution was then left overnight at room temperature and the solvent evaporated. The yellow residue (1.1 grams) crystallized from ethanol and had a melting point of 86° C. to 88° C.

U.V. in ethanol: $\lambda_{max}$=248.5 m$\mu$; $\epsilon$=27,900;
$\lambda_{max}$=318 m$\mu$, $\epsilon$=11,400

EXAMPLE 18

N-[5H-dibenzo-(a,d)-cyclohepten-5-one-11-yl]-
N'-(p-methoxyphenyl)-piperazine

To a solution of 10.25 grams potassium in 150 cc. anhydrous tertiary butanol and 100 cc. anhydrous ether was added 10.0 grams 10-bromo-5H-dibenzo-(a,d)-cyclohepten-5-one and the mixture stirred for ten minutes. N-(p-methoxyphenyl)-piperazine dichlorohydrate (19.6 grams) was then added. Stirring at room temperature was continued for six hours. The solvent was evaporated under reduced pressure (water pump; ice water was carefully added to the residue; and the mixture extracted with ethylacetate. The organic phase was washed with water to pH 7, dried over anhydrous $Na_2SO_4$, and evaporated. The yellow residue (11 grams) was crystallized from chloroform ethanol and had a melting point of 178° C. to 180° C.

U.V. in ethanol: $\lambda_{max}$=246 m$\mu$, $\epsilon$=40,100;
$\lambda_{max}$=315 m$\mu$, $\epsilon$=12,90

EXAMPLE 19

N-[5H-dibenzo-(a,d)-cyclohepten-5-one-11-yl]-
N'-(p-chlorophenyl)-piperazine

To a solution of 10.2 grams potassium in 150 cc. anhydrous tertiary butanol and 100 cc. anhydrous ether, was added 10.0 grams 5H-10-bromo-dibenzo-(a,d)-cyclohepten-5-one. After stirring at room temperature for ten minutes, 19.6 grams N-(p-chlorophenyl)-piperazine dichlorhydrate was added. Stirring was continued for six hours, and the solvent was then evaporated under reduced pressure (water pump). The residue was dissolved in ethylacetate and ice water was carefully added. The organic phase was washed with water until neutral, separated, and dried over anhydrous $Na_2SO_4$, and the solvent distilled off. The residue (16 grams) was crystallized from benzol and had a melting point of 219° C. to 221° C.

U.V. in ethanol: $\lambda_{max}$=254 m$\mu$, $\epsilon$=41,500;
$\lambda_{max}$=316m$\mu$, $\epsilon$=12,400.

EXAMPLE 20

N-[5H-dibenzo-(a,d)-cyclohepten-5-one-11-yl]-
N'-(m-methoxyphenyl)piperazine

To a solution of 10.25 grams potassium in 150 cc. anhydrous tertiary butanol and 100 cc. anhydrous ethyl ether was added 10 grams 10-bromo-5H-dibenzo-(a,d)-cyclohepten-5-one, and the mixture stirred for ten minutes. N - (m - methoxyphenyl) - piperazine dichlorhydrate (19.6 grams) was then added. Stirring at room temperature was continued for six hours. The solvent was evaporated under reduced pressure (water pump); ice water was carefully added to the residue; and the mixture was extracted with ethylacetate. The organic phase was washed with water to pH 7, dried over anhydrous $Na_2SO_4$, and evaporated. The solid yellow residue (14 grams) was crystallized from benzene and had a melting point of 137° C. to 140° C.

U.V. in ethanol: $\lambda_{max}$=248 m$\mu$, $\epsilon$=38,200;
$\lambda_{max}$=318 m$\mu$, $\epsilon$=12,000

EXAMPLE 21

N-[5H-dibenzo-(a,d)-cyclohepten-5-one-11-yl]-
N'-m-chlorophenyl-piperazine

To a solution of 10.25 grams potassium in 150 cc. anhydrous tertiary butanol and 100 cc. anhydrous ether was added 10 grams 10-bromo-5H-dibenzo-(a,d)-cyclohepten-5-one and after ten minutes, 19.6 grams N-m-chlorophenyl-piperazine dichlorhydrate. The red solution was stirred six hours at room temperature and evaporated to dryness. Water was carefully added to the residue and extraction was performed with ethylacetate. The organic layer was washed with water to neutrality and dried over anhydrous $Na_2SO_4$. The evaporated solvent left 8 grams of residue which was crystallized from benzol. The product had a melting point of 156° C. to 158° C.

U.V. in ethanol: $\lambda_{max}$=254 m$\mu$, $\epsilon$=39,900;
$\lambda_{max}$=316 m$\mu$, $\epsilon$=12,000

EXAMPLE 22

N-[5H-dibenzo-(a,d)-cyclohepten-5-one-11-yl]-N-methyl-N',N'-diethylethylenediamine To a solution of 3.88 grams potassium in 50 cc. anhydrous tertiary butanol and 100 cc. anhydrous ether was added 14 grams 10-bromo-5H-dibenzo-(a,d)-cyclohepten-5-one and 6.5 grams N-methyl-N',N'-diethyl-ethylendiamine. The solution was stirred at room temperature for five hours. The solvent was evaporated at low temperature at reduced pressure (water pump). Water was carefully added to the residue, and the mixture was extracted with ether. The organic layer was washed with water to pH 8, and then extracted with 0.1 N maleic acid. The separated aqueous layer was made alkaline with a saturated $NaHCO_3$ solution and extracted with ether. The ether layer was extracted with 1 N NaOH, washed to neutrality, and dried over anhydrous $Na_2SO_4$. The solvent was evaporated, leaving a yellow-red oil (11.2 grams) which was distilled at 202° C. and at a pressure of 0.005 mm. Hg.

U.V. in ethanol: $\lambda_{max}$=248.5 m$\mu$, $\epsilon$=27,100;
$\lambda_{max}$=320 m$\mu$, $\epsilon$=10,500

EXAMPLE 23

N-[5H-dibenzo-(a,d)-cyclohepten-5-one-11-yl]-N',
N'-dimethylethylendiamine

To a solution of 5.6 grams potassium in 80 cc. anhydrous tertiary butanol and 10 cc. anhydrous ether was added 20 grams 10-bromo-5H-dibenzo-(a,d)-cyclohepten-5-one and 12.4 grams N',N'-dimethyl-ethylendiamine. The solution was stirred at room temperature for five hours, and the solvent evaporated at reduced pressure (water pump). After careful addition of 200 cc. water, the mixture was extracted with ether. The organic layer was separated and extracted with 0.1 N maleic acid, and the ether layer was discarded. The aqueous solution was made alkaline with $NaHCO_3$ and extracted with ether. The ether layer was extracted with 2 N NaOH, washed to neutrality with water, and dried over anhydrous $Na_2SO_4$. The solvent was evaporated at reduced pressure (water pump). The yellow oily residue (4.57 grams) was distilled at 0.005 mm. Hg pressure at 148° C.

U.V. in ethanol: $\lambda_{max}$=238 m$\mu$ $\epsilon$=22,500; $\lambda_{max}$=322 m$\mu$; $\epsilon$=8,500.

EXAMPLE 24

N-[5H-dibenzo-(a,d)-cyclohepten-5-one-11-yl]-N'-
(α-N-ethylacetamide)-piperazine N-[5H - dibenzo - (a,d) - cyclohepten - 5 - one-11-yl]-piperazine (1 gram), 0.42 gram chloracetic acid ethyl amide, and 2 grams $K_2CO_3$ are refluxed in 10 cc. benzol for twenty-four hours. The mixture is cooled to room temperature and partitioned between water and benzol. The organic phase is extracted with 0.1 N maleic acid. The organic layer is discarded, and the aqueous layer is made alkaline with 2 N ammonia and extracted with benzol. The benzol layer is washed with water until neutral, dried over anhydrous $Na_2SO_4$, and evaporated under low pressure (water pump). The yellow oily residue (0.962 gram) is chromatographed on 50 grams activated aluminum oxide. Benzene methanol 100:1 eluted 0.735 gram which were dissolved in ethyl acetate and extracted with 2 N NaOH. The organic layer was separated, washed with water to neutrality, and the solvent distilled off. The yellow solid was crystallized from ether and had a melting point of 99° C. to 102° C.

U.V. in ethanol: $\lambda_{max}=248.5$ m$\mu$; $\epsilon=27,500$; $\lambda_{max}=18$ m$\mu$, $\epsilon=11,200$.

EXAMPLE 25

N-[3-chloro-5H-dibenzo-(a,d)-cyclohepten-5-one-10-(or 11)-yl]-N'-methylpiperazine To a solution of 5 grams potassium in 70 cc. anhydrous tertiary butanol and 70 cc. anhydrous ether was added a solution of 20 grams 3-chloro-5H-10-(or 11)-bromo-5H-dibenzo-(a,d)-cyclohepten-5-one and 24 grams N'-methylpiperazine in 300 cc. anhydrous ether. After sixteen hours of stirring at room temperature, the mixture was carefully poured in ice water and extracted with ethyl acetate. The organic layer was washed to neutrality with water and successively extracted with 0.5 N maleic acid. The organic phase was discarded. The aqueous solution was brought to pH 9 with a saturated $NaHCO_3$ and extracted with ethyl acetate. The organic phase was washed with 2 N NaOH, then with water to neutrality, dried over anhydrous $Na_2SO_4$, and the solvent distilled off. The residue (16 grams) was crystallized from benzol ether and had a melting point of 160° C. to 162.5° C.

U.V. in ethanol: $\lambda_{max}=248$ m$\mu$, $\epsilon=28,900$; $\lambda_{max}=322$ m$\mu$, $\epsilon=13,700$.

The solution of 2.71 grams of N-[3-chloro-5H-dibenzo-(a,d)-cyclohepten-5-one-10-(or 11)-yl]-N'-methylpiperazine in 50 cc. anhydrous hot ethanol is added to the solution of 1 gram maleic acid in 10 cc. anhydrous ethanol. Ether (100 cc.) is added and the solution left overnight at 4° C. The precipitated crystals (3 grams) are collected, washed with ether, and crystallized from ethanol. The product had a melting point of 169° C. to 172° C. (decomposition).

U.V. in ethanol: $\lambda_{max}=248$ m$\mu$; $\epsilon=28,500$; $\lambda_{max}=318$ m$\mu$, $\epsilon=13,600$.

EXAMPLE 26

N-[3-methyl-5H-dibenzo-(a,d)-cyclohepten-5-one-10-(or 11)-yl]-N'-methylpiperazine To a solution of 0.4 gram potassium in 10 cc. anhydrous tertiary butanol and 50 cc. anhydrous ether was added a solution of 1.1 grams 3-methyl - 10 - (or 11)-bromo-5H-dibenzo - (a,d) - cyclohepten-5-one and 1.3 grams N'-methylpiperazine in 50 cc. anhydrous ether. The mixture was stirred for six hours at room temperature, poured carefully in ice water, and extracted with ether. The ethereal solution was washed with water to neutrality, extracted with 0.1 N maleic acid, and the organic phase was discarded. The aqueous solution was brought to pH 9 with saturated $NaHCO_3$ and extracted with ether. The organic phase was washed with 2 N NaOH, then to neutrality with water, dried over anhydrous $Na_2SO_4$, and the solvent evaporated. The yellow residue (1.2 grams) was crystallized from ethanol and had a melting point of 169° C. to 171° C.

U.V. in ethanol: $\lambda_{max}=250$ m$\mu$, $\epsilon=29,600$; $\lambda_{max}=318$ m$\mu$, $\epsilon=11,700$.

The solution of 50 milligrams of N-[3-methyl-5H-dibenzo - (a,d) - cyclohepten - 5 - one-10-(or 11)-yl]-N'-methylpiperazine in 2 cc. hot ethanol was added to the solution of 20 milligrams maleic acid in 2 cc. ethanol. Ether (10 cc.) is added, and the solution was left for five hours at 4° C. The crystalline precipitate was separated, washed with cold ether and crystallized from ethanol. The product had a melting point of 170° C.

U.V. in ethanol: $\lambda_{max}=250$ m$\mu$, $\epsilon=29,500$; $\lambda_{max}=318$ m$\mu$, $\epsilon=11,400$.

EXAMPLE 27

N-[5H-dibenzo-(a,d)-cyclohepten-5-one-11-yl]-N-methyl-N',N'-dimethyl-trimethylendiamine To a solution of 19 grams potassium in 300 cc. anhydrous tertiary butylalcohol was added a solution of 67.7 grams 10-bromo-5H-dibenzo - (a,d) - cyclohepten-5-one. After stirring for fifteen minutes, 28 grams N-methyl-N',N'-dimethyl-trimethylendiamine dissolved in 200 cc. anhydrous ether are added. The deep red solution is stirred at room temperature for five hours and is then carefully poured in ice cold water. The mixture is extracted with ether, the organic phase is washed with water to neutrality, and extracted with 0.1 N maleic acid. The ether layer is discarded and the acidic solution is made alkaline with sodium bicarbonate and extracted with ether. The ether layer is washed with 2 N NaOH, with water to neutrality, dried over $Na_2SO_4$, and evaporated. The yellow oily residue (45 grams) is distilled under high vacuum and has a boiling pont of 195° C. to 197° C. at 0.025 mm. Hg pressure.

U.V. in ethanol: $\lambda_{max}=248$ m$\mu$, $\epsilon=27,400$; $\lambda_{max}=318$ m$\mu$, $\epsilon=10,000$.

EXAMPLE 28

N-[5H-Dibenzo-(a,d)-cyclohepten-5-one-11-yl]-N'-carbethoxy piperazine

N - [5H - dibenzo - (a,d)-cyclohepten-5-one-11-yl]-N'-methylpiperazine (20 grams) is dissolved in 250 cc. anhydrous benzene. To the refluxing solution are slowly added 16.6 cc. ethylchloroformiate dissolved in 50 cc. anhydrous benzol and reflux temperature is maintained for sixteen hours. The solution was cooled to room temperature, poured carefully in an ice cold 10 percent $Na_2CO_3$ solution, and extracted with benzene. The organic phase was successively washed with 10 percent $Na_2CO_3$, 2 N NaOH, and water. The neutral benzene solution was dried over anhydrous $Na_2SO_4$ and evaporated at reduced pressure. The solid yellow residue was crystallized from methanol. The yield was 17.212 grams of the product with a melting point of 143° C. to 145° C.

U.V. in ethanol: $\lambda_{max}=248$ m$\mu$, $\epsilon=27,800$; $\lambda_{max}=318$ m$\mu$, $\epsilon=11,400$.

EXAMPLE 29

N-[5H-dibenzo-(a,d)-cyclohepten-5-one-11-yl]-N'-methylpiperazine methiodide

To a solution of 20 grams of N-[5H-dibenzo-(a,d)-cyclohepten-5-one-11-yl]-N'-methylpiperazine in 250 cc. anhydrous ether and 250 cc. anhydrous ethanol are slowly added 8.48 grams $CH_3I$. The solution was left twelve hours at room temperature and evaporated to dryness. The solid residue (13.8 grams) crystallized from methanol and had a melting point of 271° C. to 278° C.

U.V. in ethanol: $\lambda_{max}=248$ m$\mu$, $\epsilon=26,200$; $\lambda_{max}=318$ m$\mu$, $\epsilon=11,800$.

The product N-[5H-dibenzo-(a,d)-cyclohepten-5-one-11-yl]-N'-methylpiperazine methiodide (500 milligrams) was dissolved in 15 cc. water and 5 cc. 3 N HCl. The solution is kept on the water bath for sixty minutes, cooled, and extracted with ether. The ether layer is washed with water to neutrality, dried over anhydrous $Na_2SO_4$ and evaporated. The solid residue was crystallized from ethanol and had a melting point of 112° C. to 115° C. No melting point depression in admixture with a sample of 5H-10,11-dihydro-dibenzo(a,d)-cyclohepten-5,10-dione.

EXAMPLE 30

N-[5H-dibenzo-(a,d)-cyclohepten-5-one-11-yl]-N-methyl-N',N'-dimethyl-trimethylendiamine methiodide To a solution of 15.89 grams N-[5H-dibenzo-(a,d)- cyclohepten - 5 - one-11-yl]-N-methyl-N',N' - dimethyl trimethylendiamine in 200 cc. anhydrous ethanol and 100 cc. anhydrous ether are slowly added 6.40 grams $CH_3I$. The solution was left one night at room temperature. The yellow precipitate (14.4 grams) was filtrated and crystallized from ethanol/water 80:20. The product had a melting point of 229° C. to 231.5° C.

U.V. in ethanol: $\lambda_{max}$=247 m$\mu$, $\epsilon$=25,500; $\lambda_{max}$=318 m$\mu$, $\epsilon$=10,800.

EXAMPLE 31

N-[5H-dibenzo-(a,d)-cyclohepten-5-one-11-yl]-N-methyl-N',N'-dimethyl ethylendiamine To a solution of 10.8 grams potassium in 150 cc. anhydrous tertiary butanol and 200 cc. anhydrous ether was added 38.5 grams 10-bromo - 5H - dibenzo-(a,d)-cyclohepten-5-one. After stirring for fifteen minutes, 13.8 grams N-methyl - N',N' - dimethyl ethylendiamine dissolved in 70 cc. anhydrous ether are added. Stirring is continued for eight hours at room temperature. The solution is partitioned between ether and water. The ether layer is washed with water to neutrality, extracted with 0.1 N maleic acid, and discarded. The organic layer is washed with 2 N NaOH and then with water until neutral. The separated ether phase is dried over anhydrous $Na_2SO_4$ and evaporated. The yellow oily residue (27 grams) was distilled under high vacuum and has a boiling point of 205° C. at 0.01 mm. Hg pressure.

U.V. in ethanol: $\lambda_{max}$=248 m$\mu$, $\epsilon$=27,600; $\lambda_{max}$=318 m$\mu$, $\epsilon$=11,000.

EXAMPLE 32

N-[5H-dibenzo-(a,d)-cyclohepten-5-one-11-yl]-N-methyl-N',N'-diethyl-ethylendiamine methiodide To a solution of 7.7 grams N - [5H - dibenzo-(a,d)-cyclohepten-5-one-11-yl] - N - methyl - N',N' - diethyl-ethylendiamine dissolved in 100 cc. anhydrous ethanol is added a solution of 2.9 grams $CH_3I$ in 50 cc. anhydrous ethanol. After three days at room temperature, the semi-solid precipitate was collected and crystallized from methanol. The yellow crystalline compound (2.8 grams) had a melting point of 153° C. to 155° C.

U.V. in ethanol: $\lambda_{max}$=222 m$\mu$, $\epsilon$=25,900; $\lambda_{max}$=246 m$\mu$, $\epsilon$=25,900; $\lambda_{max}$=316 m$\mu$, $\epsilon$=11,000.

What is claimed is:
1. Compounds of the group consisting of those having the general formula:

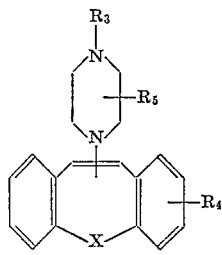

in which $R_3$ and $R_5$ are members of the group consisting of hydrogen, alkyl, $-CH_2CH=CH_2$, $-CH_2C\equiv CH$,

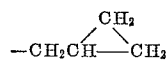

phenyl, benzyl, cyanoethyl, chlorophenyl, ethoxy ethyl, ethyl acetamide, methoxyphenyl, carbalkoxy, and hydroxyalkyl, $R_4$ is a member of the group consisting of hydrogen, halogen, lower alkyl, alkoxy, amino, monoalkylamino, diethylamino, and trifluoromethyl, and X is =C=O or =CHOH, and the acid addition salts thereof.

2. N-[5H - dibenzo - (a,d)-cyclohepten-5-one-11-yl]-N'-methylpiperazine.

3. N-[5H - dibenzo - (a,d)-cyclohepten-5-one-11-yl]-N'-benzylpiperazine.

4. N-[5H - dibenzo - (a,d)-cyclohepten-5-one-11-yl]-N'-ethylpiperazine.

5. N-[5H - dibenzo - (a,d)-cyclohepten-5-one-11-yl]-piperazine.

6. N-[5H - dibenzo - (a,d) - cyclohepten-5-one-11-yl]-N'-(propyl-2-methyl)-piperazine.

7. A method of preparing the compounds of claim 2 which comprises reacting a compound of the formula

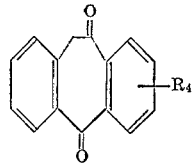

with a secondary amine of the formula:

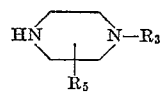

in which $R_3$, $R_4$, and $R_5$ are as defined in claim 2.

References Cited

UNITED STATES PATENTS

| | | | |
|---|---|---|---|
| 3,257,404 | 6/1966 | Fouche | 260—268 |
| 3,337,554 | 8/1967 | Jilek et al. | 260—268 |

FOREIGN PATENTS

| | | |
|---|---|---|
| 1,068,451 | 5/1967 | Great Britain. |
| 678,483 | 8/1966 | Belgium. |

OTHER REFERENCES

Tochterman et al.: Ber., vol. 97, pp. 1318–28 (1964).

ALEX MAZEL, Primary Examiner

D. G. DAUS, Assistant Examiner

U.S. Cl. X.R.

260—567.6, 570.5, 570.8, 590, 690; 424—250, 330